United States Patent
Singh

(10) Patent No.: US 10,008,115 B2
(45) Date of Patent: Jun. 26, 2018

(54) VISUAL VEHICLE PARKING OCCUPANCY SENSOR

(71) Applicant: Analog Devices Global, Hamilton (BM)

(72) Inventor: Raka Singh, Bangalore (IN)

(73) Assignee: Analog Devices Global, Hamilton (BM)

( * ) Notice: Subject to any disclaimer, the term of this patent is extended or adjusted under 35 U.S.C. 154(b) by 0 days. days.

(21) Appl. No.: 15/056,645

(22) Filed: Feb. 29, 2016

(65) Prior Publication Data

US 2017/0249840 A1    Aug. 31, 2017

(51) Int. Cl.
| | | |
|---|---|---|
| G08G 1/14 | (2006.01) | |
| G08G 1/16 | (2006.01) | |
| G06K 9/00 | (2006.01) | |
| G06K 9/46 | (2006.01) | |
| G06K 9/66 | (2006.01) | |

(52) U.S. Cl.
CPC ......... *G08G 1/141* (2013.01); *G06K 9/00812* (2013.01); *G06K 9/4604* (2013.01); *G06K 9/66* (2013.01); *G08G 1/168* (2013.01)

(58) Field of Classification Search
CPC .. G06K 9/00812; G06K 9/00208; G08G 1/14; G08G 1/147; G08G 1/015; G08G 1/146
See application file for complete search history.

(56) References Cited

U.S. PATENT DOCUMENTS

| | | | | |
|---|---|---|---|---|
| 5,910,817 A | * | 6/1999 | Ohashi | G06K 9/00208 340/903 |
| 6,107,942 A | * | 8/2000 | Yoo | G08G 1/14 340/468 |
| 6,285,297 B1 | * | 9/2001 | Ball | G08G 1/14 340/932.2 |
| 6,426,708 B1 | * | 7/2002 | Trajkovic | G08G 1/14 340/932.2 |

(Continued)

FOREIGN PATENT DOCUMENTS

| | | |
|---|---|---|
| DE | 102014106506 A1 | 11/2015 |
| EP | 2378465 A1 | 10/2011 |
| WO | WO-2012159109 A2 | 11/2012 |

OTHER PUBLICATIONS

Bin Tian, Brendan Tran Morris, Ming Tang, Member, IEEE—Hierarchical and Networked Vehicle Surveillance in ITS, Feb. 15, 2014—IEEE Transactions on Intelligent Transportation Systems.*

(Continued)

*Primary Examiner* — Mirza Alam
(74) *Attorney, Agent, or Firm* — Schwegman Lundberg & Woessner, P.A.

(57) ABSTRACT

System and techniques for a visual vehicle parking occupancy sensor are described herein. A color image, including a parking space, is received from a camera. A cascaded search for vehicle features in a hue-saturation-value (HSV) converted version of the color image is performed to produce search results. A search for macro vehicle features in the color image is also performed to produce an indication (Continued)

of found macro vehicle features when the search results are of a first type. An occupancy indicator is provided based on the search results when the search results are of a second type and based on the indication otherwise.

26 Claims, 6 Drawing Sheets

(56) References Cited

U.S. PATENT DOCUMENTS

| | | | |
|---|---|---|---|
| 7,893,847 B2 | 2/2011 | Shanbhag et al. | |
| 8,923,565 B1 | 12/2014 | Zhang et al. | |
| 2010/0066828 A1 | 3/2010 | Disaro et al. | |
| 2015/0199806 A1* | 7/2015 | Tseng | G06T 7/004 382/104 |
| 2016/0093214 A1* | 3/2016 | Wu | G08G 1/147 348/148 |

OTHER PUBLICATIONS

Arrospide, Jon, et al., "HOG-like Gradient-based Descriptor for Visual Vehicle Detection", 2012 IEEE Intelligent Vehicles Symposium, (2012), 6 pgs.

Comaniciu, Dorin, et al., "Mean Shift: A Robust Approach Toward Feature Space Analysis", IEEE Transactions on Pattern Analysis and Machine Intelligence, 24(5), (May 2002), 603-619.

Liu, Siming, "Robust Vehicle Detection from Parking Lot Images", Technical Report, Boston University, (Dec. 20, 2005), 27 pgs.

Negri, Pablo, et al., "Benchmarking haar and histograms of oriented gradients features applied to vehicle detection", ICINCO 2007—International Conference on Informatics in Control, Automation and Robotics, (Jan. 2007), 359-364.

Tru, Nicholas, "Vacant Parking Space Detection in Static Images", University of San Diego, San Diego, CA, 6 pgs.

Wen, Xuezhi, et al., "Improved Wavelet Feature Extraction Methods Based on HSV Space for Vehicle Detection", MVA2007 IAPR Conference on Machine Vision Applications, May 16-18, 2007, Tokyo, Japan, (2007), 376-379.

"International Application Serial No. PCT/IB2017/000248, International Search Report dated Jul. 13, 2017", 4 pgs.

"International Application Serial No. PCT/IB2017/000248, Written Opinion dated Jul. 13, 2017", 8 pgs.

Hajar, Emami, et al., "Real Time Vehicle Make and Model Recognition Based on Hierarchical Classification", International Journal of Machine Learning and Computing, vol. 4, No. 2, (Apr. 1, 2014), 142-145.

Mehran, Kafai, et al., "Dynamic Bayesian Networks for Vehicle Classification in Video", IEEE Transactions on Industrial Informatics, IEEE Service Center, New York, NY, US, vol. 8, No. 1, (Feb. 1, 2012), 100-109.

Tian, Bin, et al., "Rear-View Vehicle Detection and Tracking by Combining Multiple Parts for Complex Urban Surveillance", IEEE Transactions on Intelligent Transportation Systems, IEEE, Piscataway, NJ, USA, vol. 15, No. 2, (Apr. 1, 2014), 597-606.

* cited by examiner

US 10,008,115 B2

VISUAL VEHICLE PARKING OCCUPANCY SENSOR

TECHNICAL FIELD

Embodiments described herein generally relate to a vehicle parking sensor artificial intelligence and more specifically a visual vehicle parking occupancy sensor.

BACKGROUND

Vehicle parking occupancy sensing includes a variety of devices and techniques used to determine whether a vehicle is parked in a designated parking space. Determining vehicle occupancy in parking spaces can lead to more efficient parking management by, for example, a facility such as a hotel or other venue. Such systems are becoming more prevalent as "smart buildings" are gaining popularity for reducing staff via greater automation.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A variety of hardware can be combined with a variety of techniques to implement vehicle parking occupancy sensors. For example, sensors, such as piezo-electric sensors, can be embedded in parking surfaces and sense the presence of absence of a vehicle in the space. The sensors, however, can represent a significant infrastructure investment. Other techniques, such as using depth cameras, can also be used to measure whether or not the parking space is flat (i.e., there is nothing occupying the space) or not (e.g., there is something occupying the space. Depth cameras, however, may be expensive, or lack the range to be efficiently deployed.

A less expensive, and thus more palatable option to those discussed above, include general light-based two-dimensional cameras. In contrast to the surface embedded sensors or depth-based solutions, light-based cameras cannot rely on a simple measurement to determine occupancy of the space. Rather, the noise of the environment and recognition of at least part of a vehicle is needed. Further, a relatively high accuracy (e.g., 95% or higher accuracy) is useful for being able to rely on the automation and base other decisions off of the vehicle parking occupancy sensor's results.

To address the issues noted above, the vehicle parking occupancy sensor discussed herein can use a two-dimensional camera to cover one or more parking spots. The camera provides images to a controller, the controller using computer vision components to ascertain occupancy of a parking space. To increase the efficiency and accuracy of the occupancy results, the controller implements a multi-phased search for a variety of vehicle features. In an example, the results from an earlier search can be used to refine the search space for later searches, reducing the time and power of the searches while also increasing accuracy. Further, when a color camera is used, aspects of the color image can be treated differently to refine searches and provide more accurate results. In this way, a cost effective hardware installation can provide accurate occupancy results for parking spaces. Additional details and embodiments are described below.

Figure 1:
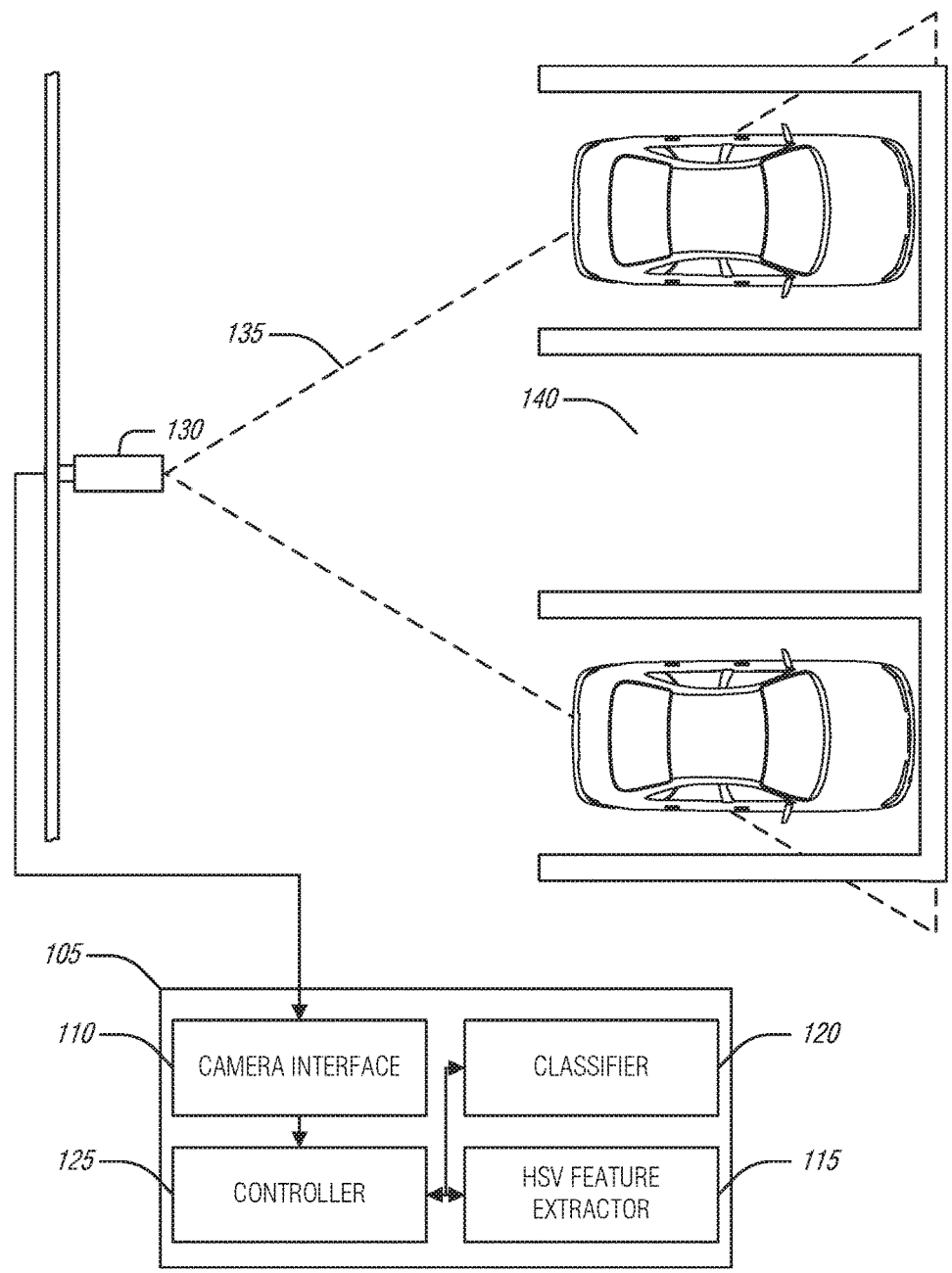
FIG. 1 is a block diagram of an example of an environment including a system for a visual vehicle parking occupancy sensor, according to an embodiment.

FIG. 1 is a block diagram of an example of an environment including a system 105 for a visual vehicle parking occupancy sensor, according to an embodiment. The system 105 can include a camera interface 110, a controller 125, a classifier 120, and an HSV feature detector 115. Each of these components are implemented in hardware, such as computer hardware like that described below with respect to FIG. 9. Further, the illustrated connections between component may be wired (e.g., via a buss, serial interface, network, etc.) or wireless (e.g., radio frequency (RF), light-based such as infrared (IR), etc.).

The environment of FIG. 1 includes a camera 130 mounted on a fall with a field of view 135 that includes three parking spaces, two occupied and an empty parking space 140. The total number of parking spaces that can be covered by a single camera 130 is dependent on the field of view, as well as interference from structures or other parked cars. However, generally, at least three spaces are available as the camera 130 can be centered on a first space (here the empty space 140) and capture two adjoining spaces.

Figure 2:
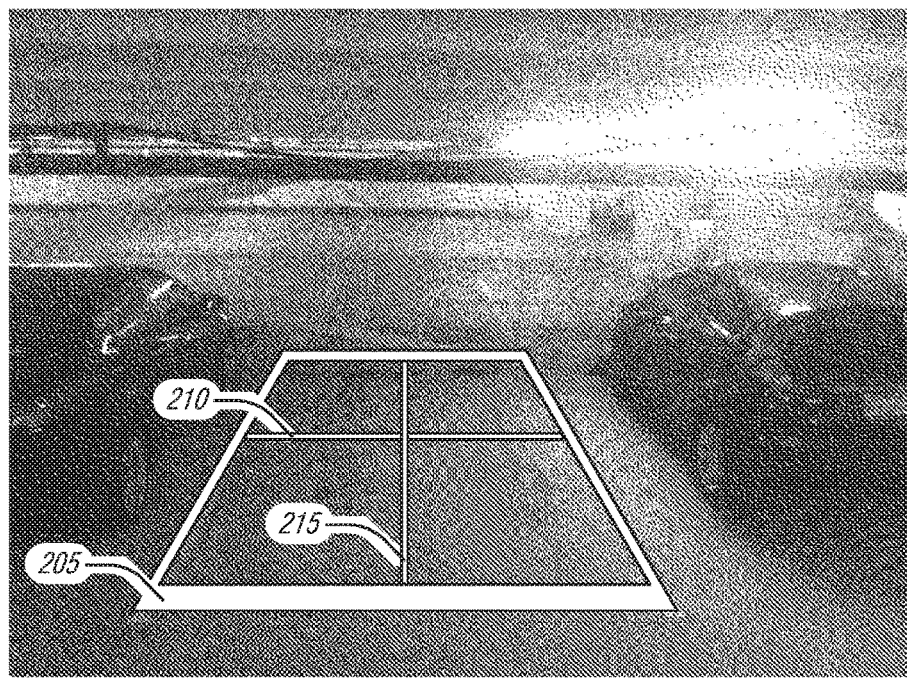
FIG. 2 illustrates an image from a camera of a parking space with filter markings, according to an embodiment.
Figure 3:
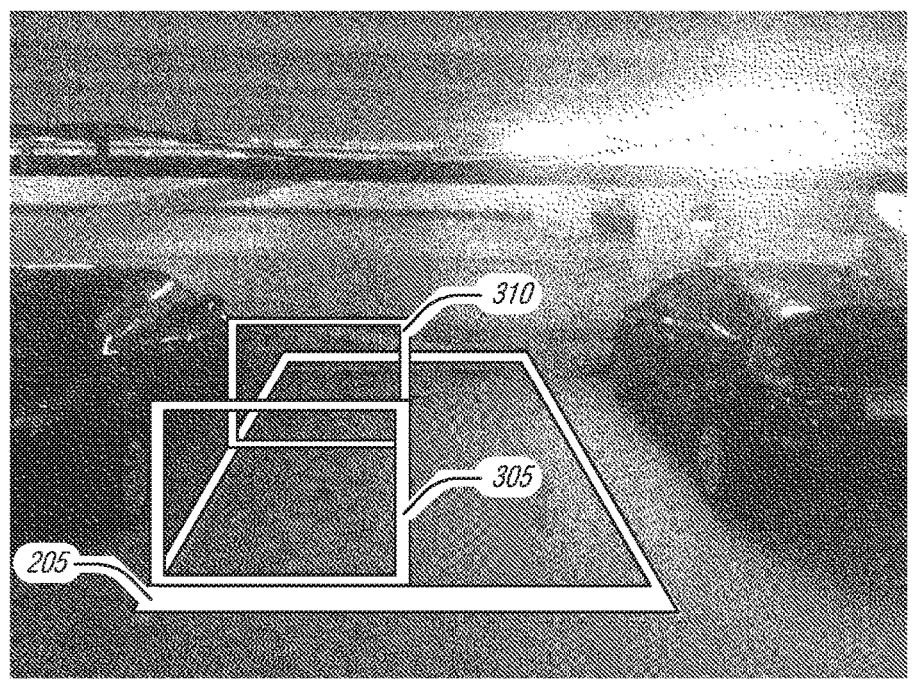
FIG. 3 illustrates an image from a camera of a parking space with filter markings, according to an embodiment.

The system 105 may optionally include a filter (not shown) to subdivide the image in a variety of ways. The filter is another hardware implemented component. The filter can be arranged to fit a geometric shape (e.g., a box) within lines painted on the surface to define a region of interest for a given parking space. An example of this is illustrated in FIG. 2. The filter can also provide additional guides or scanning windows based on the region of interest, some of which are illustrated in FIGS. 2 and 3. These divisions can be based on a combination of sensed environmental aspects (e.g., the lines), and pre-defined setup parameters (e.g., the camera's height, pitch, distance to the parking space, optical characteristics of the lens, human definitions of or adjustments to regions of interest, etc.)

The regions of interest or scanning windows can be used as masks to discriminate between pixels that may be relevant for a given parking space and pixels that are irrelevant. In an example, the region of interest is used to establish vertical scanning windows which can be used by the other components (e.g., the HSV feature extractor 115 or the classifier 120) to perform their searches. By partitioning the image, the searches may be performed on a smaller data set (of pixels), increasing efficiency while increasing accuracy by eliminating noise.

The HSV feature extractor 115 is arranged to perform a cascaded search for vehicle features in an HSV encoded image and return search results. The search is a cascaded search because a plurality of searches are performed serially. The results of previous searches can terminate the cascaded search, for example, when enough features of sufficient quality are found. In an example, the HSV feature extractor 115 searches for a set of initial vehicle features. If a sufficient number of these features are not found (e.g., two or more) or the confidence score of a given result is too low, the HSV feature extractor 115 proceeds to search for a subsequent vehicle feature.

In an example, the search for the set of initial vehicle features is performed in a hue space of the HSV encoded image. Hue space and value space are described below with respect to FIG. 4. In essence, however, the hue space includes useful color information while the value space does not used color. In an example, the HSV feature extractor 115 segments the hue space by hue. The segmentation involves locating groups (e.g., blobs) of pixels by color and space. Usually, there are fewer segments than represented hues, and thus thresholding, or clustering or employed to establish the segments. In an example, a taillight is an initial vehicle feature, the taillight identified by a red hue segment. In this example, a band of colors that represent red are segmented. The resultant blobs can be measured for size, position (e.g., in the image), etc. to determine whether they fit a model for a taillight. The confidence score can be based on variance in any of the model fitting dimensions. In an example, the HSV feature extractor 115 performs a symmetry measurement between the red hue segment and a second red hue segment to confirm that the taillight is identified. Other symmetrical features can include headlights, side view mirrors, etc.

In an example, a contrasting vehicle color is an initial vehicle feature. As used herein, the contrasting vehicle color is beyond a threshold different (e.g., different enough) than a surface color for the parking space. Thus, a vehicle that is blue will likely be easily discernible in a light grey concrete parking space 140. The respective confidence score can be based on the closeness of the contrasting vehicle color and the surface color, the size of the corresponding color blob, or the shape of the blob.

In an example, the search for the initial vehicle features is performed in a value space of the HSV encoded image. As used herein, the value space being the complement to the hue space (see FIG. 4 below). In an example, a license plate is an initial vehicle feature identified by a value space segment conforming to a shape model of a license plate. The shape model embodies measurements and tolerances (e.g., a foot wide give-or take three inches) of an object. Thus, the dimensions or position (e.g., in the image) of the license plate as well as acceptable variances are encoded in the shape model. The variances from the shape model can be used as the confidence score. Thus, a rectangle at the outer-edge of tolerance in height but the lower edge of tolerance for width will have a lower confidence score than a different rectangle close to the desired measurements.

As noted above, confidence scores can be assigned to any search of a given initial vehicle feature. An aggregate confidence score is a combination of previously determined confidence scores. The combination can be a linear or non-linear combination. In an example, if the aggregate confidence score exceeds a threshold, the cascaded search terminates.

Figure 5:
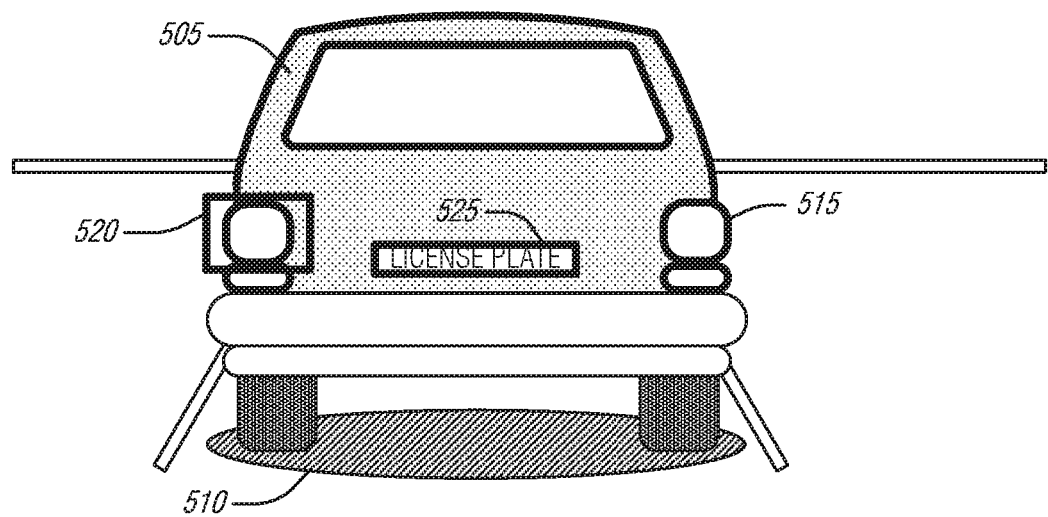
FIG. 5 illustrates an example of an HSV feature extractor results, according to an embodiment.

In an example, the search result for an initial vehicle feature search can also include a focus window. A focus window is a geometric shape that relates to the found feature. In an example, the focus window is centered (e.g., on the center mass) of the blob corresponding to the found feature. In an example, the focus window encompasses the blob. Additional details and examples of initial vehicle features and focus windows are illustrated in FIG. 5 and described below.

In an example, to search for subsequent vehicle features, the HSV feature extractor 115 is arranged to perform clustering of the HSV space to produce a plurality of blobs. In an example, to perform the clustering, the HSV feature extractor 115 is arranged to execute K-means clustering to produce segments. The, a mean shift is applied to the segments. In an example, any or all of hue, saturation, value, x position (e.g., coordinate), or y position can be used as parameters to the mean shifting of segments.

Figure 6:
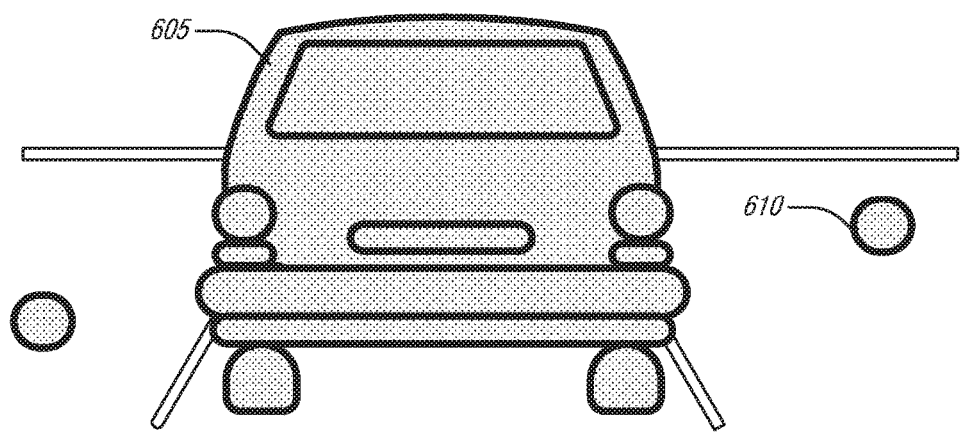
FIG. 6 illustrates an example of clustering blobs in an image to determine occupancy, according to an embodiment.

The HSV feature extractor 115 is arranged to count the plurality of blobs. The count is then compared to a threshold. If the count exceeds the threshold, the HSV feature extractor 115 indicates (e.g., via a search result) that the subsequent vehicle features are found. Thus, the subsequent vehicle features are lumped together in a single search, such that, although a variety of features can be identified (e.g., windows, doors, body panels, etc.) it is the aggregation of several features in the space 140 that indicates occupancy, versus the relatively empty space 140 otherwise. FIG. 6 illustrates subsequent feature search which is also described below.

The classifier 120 is arranged to perform a search for macro vehicle features in an image and return an indication of found macro vehicle features. In an example, the classifier 120 can use multiple scales to scan the image, the entire region of interest, a scanning window, or a focus window. In an example, the classifier 120 can use the focus window to target a search. Moreover, the classifier 120 can use the confidence score of a given initial feature search result to modify its confidence (e.g., bias) score to improve detection.

The classifier 120 can be implemented with a variety of computer vision techniques. In an example, a histogram of oriented gradients (HOG) feature descriptor to the search space (e.g., pixels). The results of the HOG may be used in a support vector machine (SVM) trained on HOG results for the specific macro vehicle features. Other techniques that can be employed to implement the classifier 120 include wavelet or Gabor filter output in an SVM, local binary patterns (LBP) and a multistage rejection classifier, among others.

In an example, the macro vehicle features that are searched include a bumper or a body. In an example, the classifier 120 is trained to identify a vehicle bumper (e.g., rear, front, side, oblique, etc.) or vehicle body (e.g., rear, front, side, oblique, etc.). In an example, the classifier 120 is a combination of sub classifiers for different macro vehicle features. In an example, the bumper sub-classifier performs a search prior to a vehicle body sub classifier.

In an example, the classifier 120 confines its search to macro-vehicle features identified in the HSV feature extractor 115 search results. For example, if a taillight is identified, those search results are used by the classifier 120 to search for a bumper horizontally located near the found taillight.

The controller 125 is arranged to coordinate between the camera 130 (via the camera interface 110), the HSV feature extractor 115, the classifier 120, and other systems that take occupancy indicators as input. Thus, the controller is arranged to invoke the HSV feature extractor 115 on an HSV converted version of the color image to produce the search results. The search results may be of a first type or a second type. If the search results are of a first type, the controller 125 is built to invoke the classifier 120 on the color image (e.g., unconverted to HSV).

The type of search results is based on the confidence of the result. Results of the first type have a confidence level such that the additional invocation of the classifier 120 is helpful. Results of the second type are strong enough to stand on their own. In an example, if subsequent vehicle features are searched by the HSV feature extractor 115, the returned results will be of the second type. In an example, if the confidence score in the search results is beyond a threshold, the search results will be of the second type. In an example, if the number of initial vehicle features is beyond a threshold (e.g., two) the results will be of the first type. In this example, the subsequent features may not have been searched, but a sufficient confidence level (here measured by how many features were found rather than aggregate confidence score) was not reached to be sure that a vehicle occupies the space 140. Thus, the classifier 120 can provide an additional level of confidence in the results.

The controller 125 is arranged to output an occupancy indicator based on the search results from the HSV feature extractor 115 when the search results are of the second type, the occupancy indicator based on the indication from the classifier 120 otherwise. The occupancy indicator can be a message indicating the occupancy, bringing a signal line high to indicate occupancy, or other mechanism to alert a consumer whether or not the observed parking spaces are occupied. In an example, the occupancy indicator includes a confidence value obtained from the classifier 120 or the HSV feature extractor 115 as described herein.

Using the HSV feature extractor 115 allows for fast and efficient searches of features in the image. However, cascading the search and bringing in the classifier 120 when it may be helpful, allows the controller 125 to manage power consumption, computing resources, and accuracy in a flexible and effective manner. As noted above, the visual vehicle parking occupancy sensor 105 permits an inexpensive and effective solution to automatic detection of parking occupancy.

FIG. 2 illustrates an image from the camera 130 of the parking space 140 with filter markings, according to an embodiment. The trapezoid outline 205 illustrates a region of interest for the parking space 140. The horizontal line 210 is a calibration guide, illustrating a calculated midway point for the parking space. Similarly, the line 215 is a vertical midway point for the parking space 140. These lines 210, 215, and outline 205, when combined with known data about the size of the parking space 140, yield a transformation from pixels to distance and vice versa. Further, the position and distance of the camera 130 from the parking space 140 can be used to produce the transform. In either case, the system 105 can estimate real object sizes using the pixels of the image.

FIG. 3 illustrates an image from the camera 130 of the parking space 140 with filter markings, according to an embodiment. I addition to the region of interest 205, FIG. 3 illustrates two scanning windows 305 and 310. As illustrated, the scanning windows cover a vertically oriented slice of the region of interest 205 and are sized as a function of their position in the region of interest 205. For example, the scanning window 305 is larger than the scanning window 310 because it is position closer to the camera 130, and thus each pixel within the scanning window represents a smaller distance that those of scanning window 310.

As illustrated, the scanning windows can be sized to increase their effectiveness. For example, as most vehicles are largely symmetrical, the scanning window 305 may span half (in the horizontal) the region of interest and yield good results. This further reduction in pixels that are search by other components again can increase both efficiency and accuracy as described above.

In an example, the system 105 can create a set of scanning windows. In an example, the set of scanning windows is ordered. In an example, the first ordered scanning windows is closest to the camera 130 and the order increases as the scanning windows move away from the camera 130. This allows, assuming that most vehicles fill or nearly fill the parking space 140, a relatively quick way to locate the vehicle within the depth of the parking space 140. In an example, the order is randomized.

Figure 4:
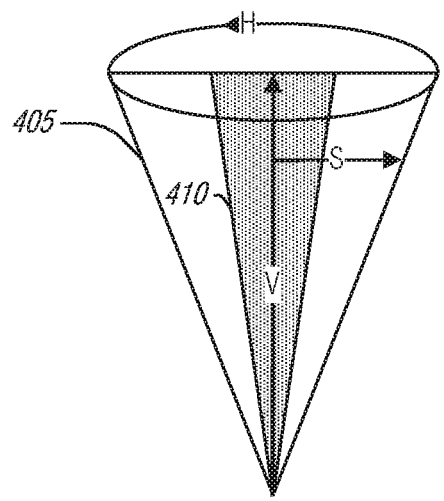
FIG. 4 illustrates an example of segregating pixels in an image using a Hue-Saturation-Value (HSV) definition of color in the image, according to an embodiment.

FIG. 4 illustrates an example of segregating pixels in an image using an HSV definition of color in the image, according to an embodiment. The cone 405 represents the HSV color space. As illustrated, at the tip of the cone 405 is the absence of color (e.g., black). As the value (the "V" line) increases, the cone 405 widens. The saturation (the "S" line) increases perpendicular to the value and can be defined as the radius of the plane at a given value. When the saturation is zero, the resultant color is an ever lightening gray until a maximum value is reached, which is white. As the saturation increases, a given hue (e.g., color) emerges from the black/grey/white of the center of the cone 405 until, at the maximum saturation, a pure form of the color is achieved. The hue is an angular value, a given hue changing until a complete circle (e.g., 360 degrees) is made, at which point the starting hue is again reached.

The region 410 is an area in which hue information is unreliable or absent because the saturation for a given hue is too low. However, value information can be used to distinguish features that are more dependent on a light and dark dichotomy (e.g., features that would be distinguishable in a grey-scale image). However, if pixels are in the complement of the region 410 in the cone 405 (e.g., the unshaded portion of the cone 405), then hue can be used to distinguish features. This region is called hue space herein and its complement is value space (e.g., region 410). Segmentation based on either hue or value in hue space and value space respectively, obviates problems in such segmentation in red-green-blue (RGB) space in which most images are encoded by the camera 130. Thus, for example, red pixels are easily discernable by selection a hue arc representative of red in the hue space and collecting pixels with those values. This technique addresses the problems of variable lighting conditions, for example, present in RGB space segmentation or filtering.

FIG. 5 illustrates an example of an HSV feature extractor results, according to an embodiment. As noted above, the HSV feature extractor 115 operates on color or value information from an HSV encoded image. Features that can be found in the search include vehicle color 505 (e.g., in hue space), taillights 515 (e.g., in hue space), or a license plate 525 (e.g., in value space).

With respect to vehicle color 505, the parking surface color 510 is compared to determine whether or not there is a color blob that differs from the parking surface color 510. A confidence score can be calculated based on the difference in hue between the vehicle color 505 and the surface color 510, for example, ignoring value information. This can address situations in which a varied lighting condition (e.g., shadows from trees on a bright day) cause the surface to have several shades, but they are different than a blue of the vehicle color 505. If, for example, the vehicle color 505 is a grey similar to the surface color 510, the vehicle color 505 feature may not be found or may be given a low confidence score. The confidence score may be based on the degree of difference in hue between the vehicle color 505 and the surface color, a volume of the vehicle color 505, a shape of a blob of the vehicle color 505, or any combination of these values.

The taillights 515, somewhat similarly to the vehicle color 505, can be found in hue space. In contrast to the vehicle color, however, the taillights 515 do not involve the searching for what the vehicle color 505 is, but limiting the search to pixels that are in a band of color (e.g., red) that correspond to tail lights. The confidence score can be based on the number of pixels found (e.g., relating to size of the taillights), position of pixels (e.g., in relation to the region of interest, a scan window, etc., that relates to a position on the vehicle), symmetry of pixels (e.g., two blobs within a threshold size or position denoting similar features symmetric to the vehicle), or any combination thereof.

Also illustrated in FIG. 5, a focus window 520 can be returned as part of the search. Here, the focus window 520 relates to the partner taillight 515, however, any of the found features can include a focus window in the search results. The focus window 520 is a geometric shape that defined in relation to the found feature (e.g., centered on the feature and size to encompass the pixels corresponding to the found feature). As noted above, the focus window can be used to further limit search spaces of, for example, the classifier 120.

The license plate 525 is a feature that can be found in value space. Generally, the license plate is a light color surrounded by darker colors. Also, generally, license plates are of a standard size. The search proceeds by locating a light segment of the value space—for example through a method of thresholding or segmentation in HSV space—with a size and shape—determined, for example, through edge detection and morphology filtering (where higher resolution of the camera permits) to fit a standard shape—that corresponds to the known characteristics of license plates. The confidence score can include a variance from an expected size, shape, orientation, or any combination thereof.

FIG. 6 illustrates an example of clustering blobs in the image to determine occupancy, according to an embodiment. As noted above, in certain circumstances, either too few vehicle features are found or the confidence score aggregate is too low to rely on the search results. To address this situation, a general segmentation of the value space across the regions of interest, scan window, or image can be performed. The segments can then be counted within the region of interest. This technique is useful because vehicles tend to have many parts (e.g., windows, panels, tires, etc.) that parking surfaces do not.

As illustrated, the collection of segments 605 (e.g., segment being outlined) is far greater than segmentation collections (e.g., segment 610) in an empty space. Thus, even if an empty space includes debris, an empty space will likely have far fewer segments than an occupied space. In an example, the number of segments denoting occupancy is fixed (e.g., invariant during normal system operation but adjustable during setup, maintenance, etc.). In an example, the number of segments denoting occupancy is based on segment counts over time (e.g. a weighted moving average) with occupancy and non-occupancy times identified by, for example, a user, or other feature searches. In an example, this collection of segments search is a second type of search result for the HSV feature extractor 115.

Figure 7:
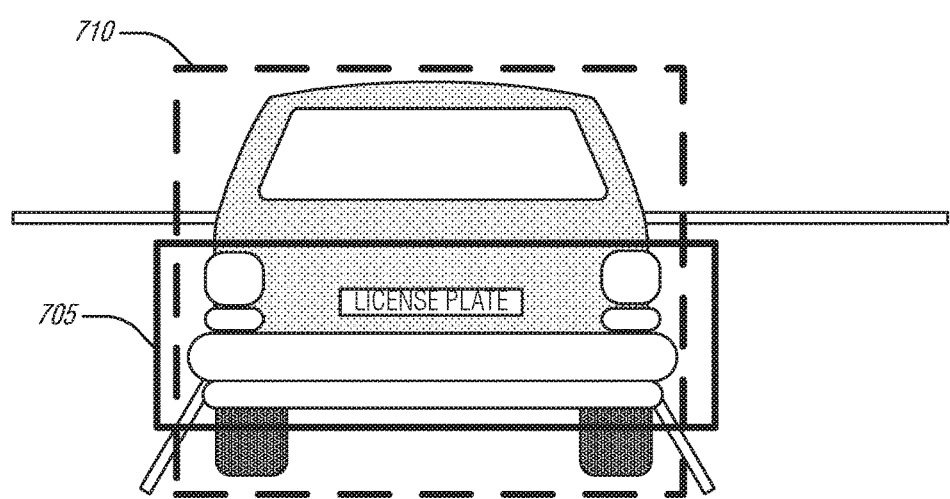
FIG. 7 illustrates example results of applying a classifier to an image, according to an embodiment.

FIG. 7 illustrates example results of applying the classifier 120 to an image, according to an embodiment. Illustrated are classification focus windows 705 for a bumper search success and 710 for a body search success. As noted above, classifiers are trained to recognize features. Here, the classifier 120 is trained to identify macro-vehicle features, such as a bumper, vehicle body, etc. Also, as noted above, the search may be limited to segments of the image based on focus windows, or scanning windows produced by other components of the vehicle parking occupancy sensor 105.

Figure 8:
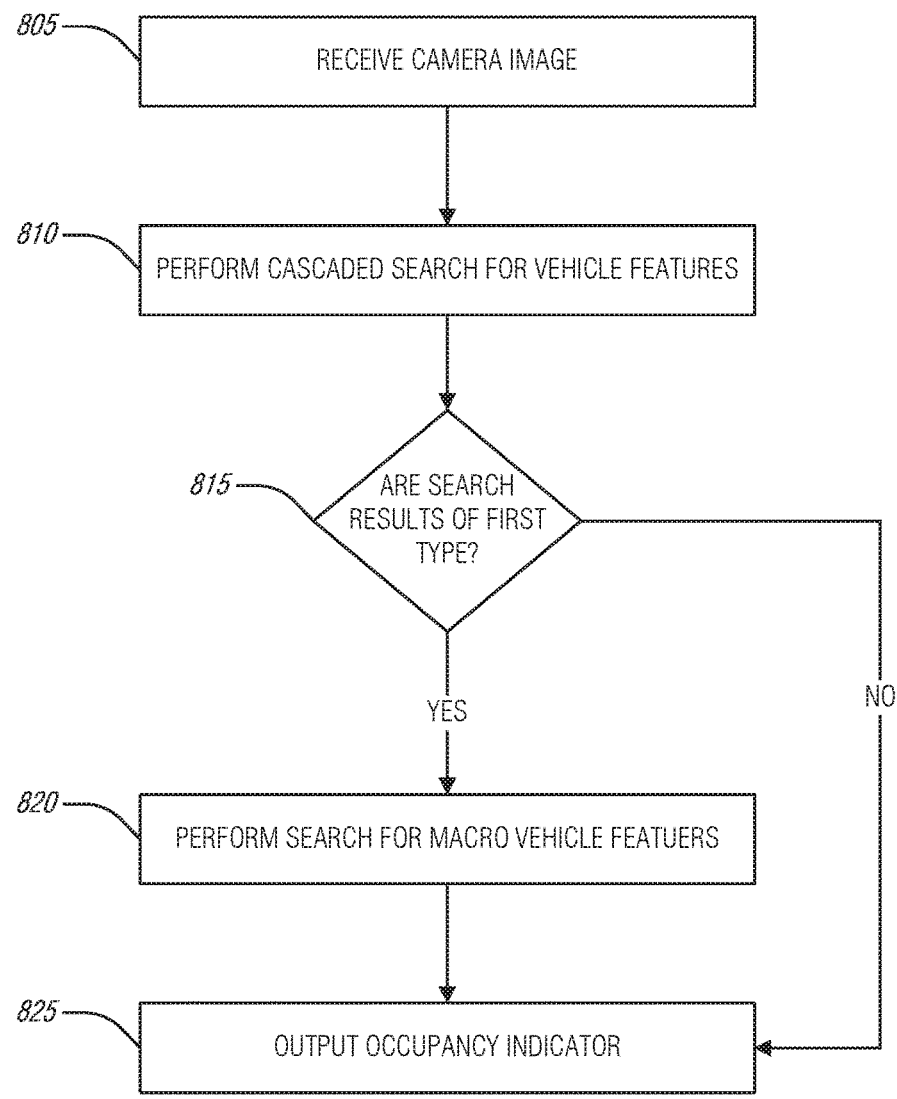
FIG. 8 illustrates an example of a method to implement a visual vehicle parking occupancy sensor, according to an embodiment.

FIG. 8 illustrates an example of a method 800 to implement a visual vehicle parking occupancy sensor, according to an embodiment.

At operation 805, a color image is received from a camera. The image includes a parking space to which an occupancy determination will be measured.

At operation 810, a cascaded search for vehicle features is conducted in an HSV converted version of the color image to produce search results. In an example, the cascaded search includes searching for a set of initial vehicle features and proceeding to searching for a subsequent vehicle feature when a threshold number of initial vehicle features are not found. In an example, the cascaded search includes searching for a set of initial vehicle features and proceeding to searching for a subsequent vehicle feature when an aggregate of confidence scores for searched initial vehicle features is below a threshold.

In an example, searching for the set of initial vehicle features is performed in a hue space of the HSV encoded image. In this example, the hue space is defined as pixels with a value and saturation level beyond a threshold, the threshold increasing as the value increases (e.g., the complement of the region 410 in the cone 405 from FIG. 4). In an example, the method 800 is optionally extended to segment the hue space by hue.

In an example, a taillight is an initial vehicle feature, the taillight identified by a red hue segment. In an example, the method 800 is optionally extended to measure symmetry between the red hue segment and a second red hue segment to confirm that the taillight is identified. In an example, a contrasting vehicle color is an initial vehicle feature. In this example, the contrasting vehicle color is beyond a threshold different than a surface color for the parking space.

In an example, searching for the initial vehicle features is performed in a value space of the HSV encoded image. As noted above, the value space is the complement to the hue space in the HSV color space. In an example, a license plate is an initial vehicle feature identified by a value space segment conforming to a shape model of a license plate. Here, the shape model can include a size, shape, or orientation of the segment.

In an example, initial vehicle features that are found are assigned a confidence score based on parameters of the search. The search parameters can differ based on what is being searched. Confidence score inputs can include a color variance, a size variance, or a location (e.g., in the image) variance from an expected result. For example, if a license plate type segment is located in an area on the image where a license plate would not be expected (e.g., in the back window of a pick-up truck) the confidence score can be reduced by the difference in position. The aggregate confidence score includes a combination of confidence scores for individual features. In an example, a running aggregate confidence score beyond a threshold halts further searches (e.g., because enough features to determine occupancy have been discovered).

In an example, the method 800 can be extended to produce a focus window for initial vehicle features that are found. In an example, the focus window is a geometric shape (e.g., a rectangle, oval, etc.) that encompasses the found initial vehicle feature and is smaller than the color image. In an example, the focus window is included in the search results.

In an example, the method 800 is optionally extended to partition the color image into a set of scanning windows. In an example, the cascaded search is performed on the scanning windows as opposed to the entire image.

In an example, searching for the subsequent vehicle feature includes clustering the HSV space to produce a plurality of blobs. The blobs (or features of the blobs such as edges, corners, etc.) can then be counted. The subsequent vehicle feature can be indicated as found when the count (e.g., of the blobs) exceeds a threshold. In an example, clustering of the HSV space includes executing a K-means clustering of pixels in the HSV space. A mean shift can then be applied to arrive at the segments. The mean shift can use any or all of the hue, saturation, value, x coordinate (e.g., in the image, scanning window, etc.) or y coordinate as segment parameters.

At decision 815, a determination of the type of search results from operation 810 is made. If search results are of a first type, the method 800 proceeds to operation 820. If the search results are of second type, the method 800 proceeds to operation 825. In an example, the search results are of the first type if either the aggregate confidence score is below a threshold or if subsequent vehicle features are searched in the cascaded search. In an example, the search result is of a second type if two or more initial vehicle features are found, for example, with sufficient confidence scores.

At operation 820, a search of macro vehicle features is performed in the color image. This search produces indications of found macro vehicle features when the search results of the operation 810 are of a first type. Operation 820 is implemented with a classifier. In an example, when a focus window is available for an initial vehicle feature, the search for macro vehicle features includes confining a search for a macro vehicle feature that corresponds to the initial vehicle feature found within the focus window. In an example, the macro vehicle features include at least one of a bumper or a body. In an example, the macro vehicle feature search is performed on a scanning windows as opposed to the entire image.

At operation 825, an occupancy indicator produced based on the search results when the search results are of a second type and based on the indication otherwise.

Figure 9:
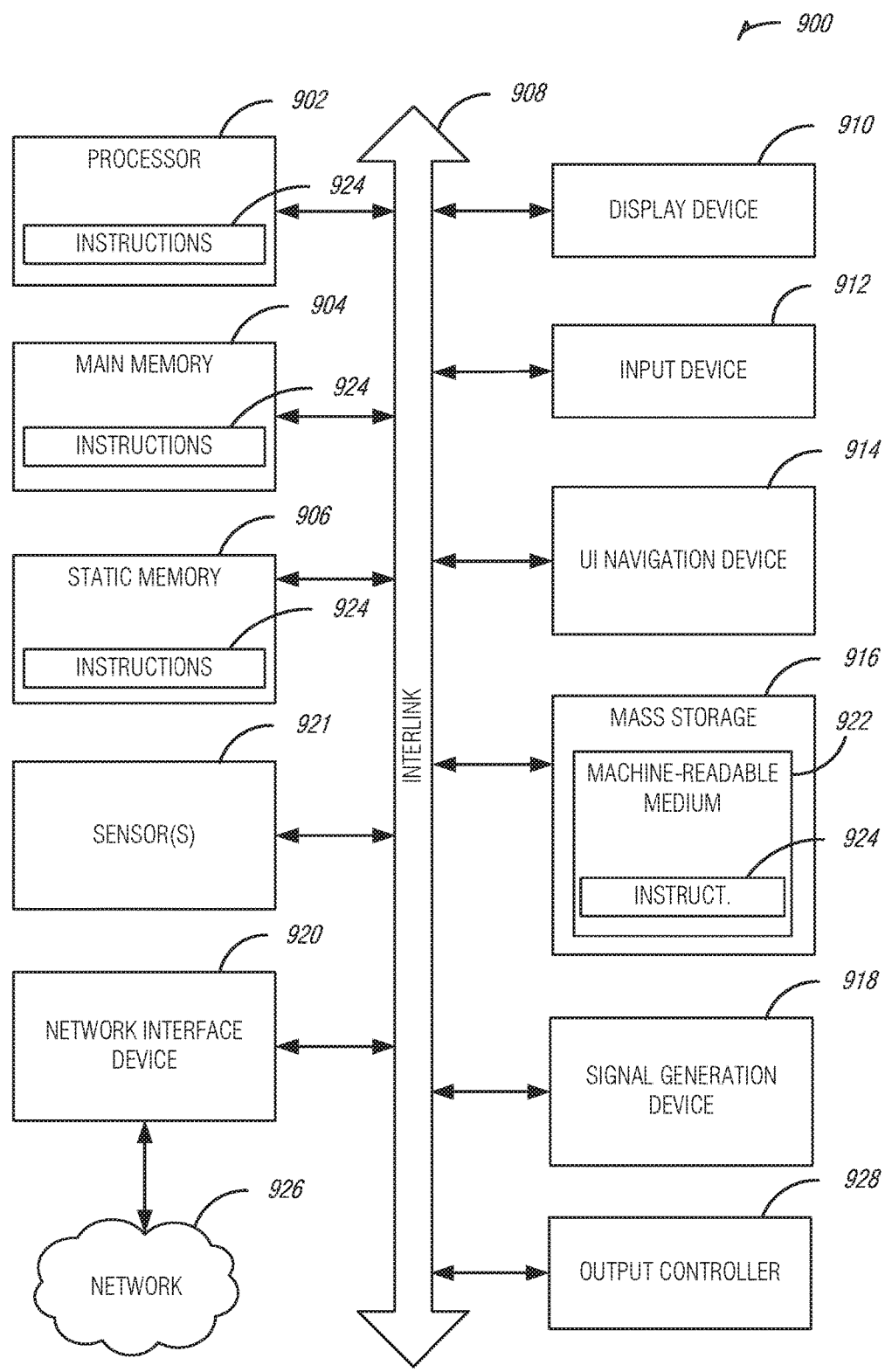
FIG. 9 is a block diagram illustrating an example of a machine upon which one or more embodiments may be implemented.

FIG. 9 illustrates a block diagram of an example machine 900 upon which any one or more of the techniques (e.g., methodologies) discussed herein may perform. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices, magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

ADDITIONAL NOTES & EXAMPLES

Example 1 is a device comprising: a camera interface to receive a color image from a camera, the image including a parking space; an HSV feature extractor to perform a cascaded search for vehicle features in a hue-saturation-value (HSV) encoded image and return search results; a classifier to perform a search for macro vehicle features in an image and return an indication of found macro vehicle features; and a controller to: invoke the HSV feature extractor on an HSV converted version of the color image to produce the search results; invoke the classifier on the color image to produce the indication when the search results are of a first type; and output an occupancy indicator based on the search results when the search results are of a second type and based on the indication otherwise.

In Example 2, the subject matter of Example 1 optionally includes a filter to partition the color image into a set of scanning windows, wherein the controller is to invoke the HSV feature extractor or the classifier on a window in the set of scanning windows.

In Example 3, the subject matter of any one or more of Examples 1-2 optionally include wherein perform the cascaded search, the HSV feature extractor is to search for a set of initial vehicle features and proceed to search for a subsequent vehicle feature when a threshold number of initial vehicle features are not found.

In Example 4, the subject matter of Example 3 optionally includes wherein the search for the set of initial vehicle features is performed in a hue space of the HSV encoded image, the hue space defined as pixels with a value and saturation level beyond a threshold, the threshold increasing as the value increases.

In Example 5, the subject matter of Example 4 optionally includes wherein the HSV feature extractor is to segment the hue space by hue.

In Example 6, the subject matter of Example 5 optionally includes wherein a taillight is an initial vehicle feature, the taillight identified by a red hue segment.

In Example 7, the subject matter of Example 6 optionally includes wherein the HSV feature extractor is to perform a symmetry measurement between the red hue segment and a second red hue segment to confirm that the taillight is identified.

In Example 8, the subject matter of any one or more of Examples 5-7 optionally include wherein a contrasting vehicle color is an initial vehicle feature, the contrasting vehicle color being beyond a threshold different than a surface color for the parking space.

In Example 9, the subject matter of any one or more of Examples 4-8 optionally include wherein the search for the initial vehicle features is performed in a value space of the HSV encoded image, the value space being the complement to the hue space.

In Example 10, the subject matter of Example 9 optionally includes wherein a license plate is an initial vehicle feature identified by a value space segment conforming to a shape model of a license plate.

In Example 11, the subject matter of any one or more of Examples 3-10 optionally include wherein initial vehicle features that are found are assigned a confidence score based on parameters of the search.

In Example 12, the subject matter of any one or more of Examples 3-11 optionally include wherein a focus window is produced for initial vehicle features that are found, the focus window being included in the search results.

In Example 13, the subject matter of Example 12 optionally includes wherein to invoke the classifier, the controller is to provide the focus window to the classifier, the classifier to confine a search for a macro vehicle feature that corresponds to the initial vehicle feature found within the focus window.

In Example 14, the subject matter of any one or more of Examples 3-13 optionally include wherein the threshold number of initial vehicle features is two.

In Example 15, the subject matter of any one or more of Examples 3-14 optionally include wherein to search for the subsequent vehicle feature, the HSV feature extractor is to: perform clustering of the HSV space to produce a plurality of blobs; count the plurality of blobs; and indicate that the subsequent vehicle feature is found when the blobs exceed a threshold.

In Example 16, the subject matter of Example 15 optionally includes wherein to perform clustering of the HSV space, the HSV feature extractor is to: execute K-means clustering to produce segments; and apply a mean shift using hue, saturation, value, x position, and y position of each of the segments as parameters.

In Example 17, the subject matter of any one or more of Examples 3-16 optionally include wherein the search results are of the first type when the HSV feature extractor searched for the subsequent vehicle feature and the search results are of the second type otherwise.

In Example 18, the subject matter of any one or more of Examples 1-17 optionally include wherein the macro vehicle features include at least one of a bumper or a body.

Example 19 is a at least one machine readable medium including instructions that, when executed by a machine, cause the machine to perform operations comprising: receiving a color image from a camera, the image including a parking space; performing a cascaded search for vehicle features in a hue-saturation-value (HSV) converted version of the color image to produce search results; performing a search for macro vehicle features in the color image to produce an indication of found macro vehicle features when the search results are of a first type; and outputting an occupancy indicator based on the search results when the search results are of a second type and based on the indication otherwise.

In Example 20, the subject matter of Example 19 optionally includes partitioning the color image into a set of scanning windows, wherein the cascaded search for vehicle features or the search for macro vehicle features is limited to a window in the set of scanning windows.

In Example 21, the subject matter of any one or more of Examples 19-20 optionally include wherein performing the cascaded search includes searching for a set of initial vehicle features and proceeding to searching for a subsequent vehicle feature when a threshold number of initial vehicle features are not found.

In Example 22, the subject matter of Example 21 optionally includes wherein searching for the set of initial vehicle features is performed in a hue space of the HSV encoded image, the hue space defined as pixels with a value and saturation level beyond a threshold, the threshold increasing as the value increases.

In Example 23, the subject matter of Example 22 optionally includes segmenting the hue space by hue.

In Example 24, the subject matter of Example 23 optionally includes wherein a taillight is an initial vehicle feature, the taillight identified by a red hue segment.

In Example 25, the subject matter of Example 24 optionally includes measuring symmetry between the red hue segment and a second red hue segment to confirm that the taillight is identified.

In Example 26, the subject matter of any one or more of Examples 23-25 optionally include wherein a contrasting vehicle color is an initial vehicle feature, the contrasting vehicle color being beyond a threshold different than a surface color for the parking space.

In Example 27, the subject matter of any one or more of Examples 22-26 optionally include wherein searching for the initial vehicle features is performed in a value space of the HSV encoded image, the value space being the complement to the hue space.

In Example 28, the subject matter of Example 27 optionally includes wherein a license plate is an initial vehicle feature identified by a value space segment conforming to a shape model of a license plate.

In Example 29, the subject matter of any one or more of Examples 21-28 optionally include wherein initial vehicle features that are found are assigned a confidence score based on parameters of the search.

In Example 30, the subject matter of any one or more of Examples 21-29 optionally include producing a focus window for initial vehicle features that are found, the focus window being a geometric shape that encompasses the found initial vehicle feature and is smaller than the color image, the focus window being included in the search results.

In Example 31, the subject matter of Example 30 optionally includes wherein performing the search for macro vehicle features includes confining a search for a macro vehicle feature that corresponds to the initial vehicle feature found within the focus window.

In Example 32, the subject matter of any one or more of Examples 21-31 optionally include wherein the threshold number of initial vehicle features is two.

In Example 33, the subject matter of any one or more of Examples 21-32 optionally include wherein searching for the subsequent vehicle feature includes: clustering of the HSV space to produce a plurality of blobs; counting the blobs; and indicating that the subsequent vehicle feature is found when the blobs exceed a threshold.

In Example 34, the subject matter of Example 33 optionally includes wherein clustering of the HSV space includes: executing K-means clustering to produce segments; and applying a mean shift using hue, saturation, value, x position, and y position of each of the segments as parameters.

In Example 35, the subject matter of any one or more of Examples 21-34 optionally include wherein the search results are of the first type when searching for the subsequent vehicle feature was performed and the search results are of the second type otherwise.

In Example 36, the subject matter of any one or more of Examples 19-35 optionally include wherein the macro vehicle features include at least one of a bumper or a body.

Example 37 is a method comprising: receiving a color image from a camera, the image including a parking space; performing a cascaded search for vehicle features in a hue-saturation-value (HSV) converted version of the color image to produce search results; performing a search for macro vehicle features in the color image to produce an indication of found macro vehicle features when the search results are of a first type; and outputting an occupancy indicator based on the search results when the search results are of a second type and based on the indication otherwise.

In Example 38, the subject matter of Example 37 optionally includes partitioning the color image into a set of scanning windows, wherein the cascaded search for vehicle features or the search for macro vehicle features is limited to a window in the set of scanning windows.

In Example 39, the subject matter of any one or more of Examples 37-38 optionally include wherein performing the cascaded search includes searching for a set of initial vehicle features and proceeding to searching for a subsequent vehicle feature when a threshold number of initial vehicle features are not found.

In Example 40, the subject matter of Example 39 optionally includes wherein searching for the set of initial vehicle features is performed in a hue space of the HSV encoded image, the hue space defined as pixels with a value and saturation level beyond a threshold, the threshold increasing as the value increases.

In Example 41, the subject matter of Example 40 optionally includes segmenting the hue space by hue.

In Example 42, the subject matter of Example 41 optionally includes wherein a taillight is an initial vehicle feature, the taillight identified by a red hue segment.

In Example 43, the subject matter of Example 42 optionally includes measuring symmetry between the red hue segment and a second red hue segment to confirm that the taillight is identified.

In Example 44, the subject matter of any one or more of Examples 41-43 optionally include wherein a contrasting vehicle color is an initial vehicle feature, the contrasting vehicle color being beyond a threshold different than a surface color for the parking space.

In Example 45, the subject matter of any one or more of Examples 40-44 optionally include wherein searching for the initial vehicle features is performed in a value space of the HSV encoded image, the value space being the complement to the hue space.

In Example 46, the subject matter of Example 45 optionally includes wherein a license plate is an initial vehicle feature identified by a value space segment conforming to a shape model of a license plate.

In Example 47, the subject matter of any one or more of Examples 39-46 optionally include wherein initial vehicle features that are found are assigned a confidence score based on parameters of the search.

In Example 48, the subject matter of any one or more of Examples 39-47 optionally include producing a focus window for initial vehicle features that are found, the focus window being a geometric shape that encompasses the found initial vehicle feature and is smaller than the color image, the focus window being included in the search results.

In Example 49, the subject matter of Example 48 optionally includes wherein performing the search for macro vehicle features includes confining a search for a macro vehicle feature that corresponds to the initial vehicle feature found within the focus window.

In Example 50, the subject matter of any one or more of Examples 39-49 optionally include wherein the threshold number of initial vehicle features is two.

In Example 51, the subject matter of any one or more of Examples 39-50 optionally include wherein searching for the subsequent vehicle feature includes: clustering of the HSV space to produce a plurality of blobs; counting the blobs; and indicating that the subsequent vehicle feature is found when the blobs exceed a threshold.

In Example 52, the subject matter of Example 51 optionally includes wherein clustering of the HSV space includes: executing K-means clustering to produce segments; and applying a mean shift using hue, saturation, value, x position, and y position of each of the segments as parameters.

In Example 53, the subject matter of any one or more of Examples 39-52 optionally include wherein the search results are of the first type when searching for the subsequent vehicle feature was performed and the search results are of the second type otherwise.

In Example 54, the subject matter of any one or more of Examples 37-53 optionally include wherein the macro vehicle features include at least one of a bumper or a body.

Example 55 is a system comprising means to perform any of the methods of Examples 37-54.

Example 56 is at least one machine readable medium including instructions that, when executed by a machine, cause the machine to perform any of the methods of Examples 37-54.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document, for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device with a camera interface to receive a camera image for use in determining occupancy of a parking space, the device comprising:
   a feature extractor to perform a cascaded search for vehicle features in an encoded image formed by encoding the camera image, and return search results, wherein to perform the cascaded search, the feature extractor is to search in the encoded image for a first set of vehicle features and proceed to search for a different second set of vehicle features when a threshold number of the first set of vehicle features are not found; and
   a controller configured to:
      invoke the feature extractor on the encoded image to produce the search results, wherein the search results are associated with a confidence score;
      invoke a classifier on the camera image, without the encoding, to perform a search for a third set of vehicle features when the confidence score is below a threshold confidence score, wherein the third set is different from the first set and the second set, and a confidence score of the classifier is based on the confidence score of the search results; and
      output an occupancy indicator based on the search results when the confidence score is at or above the threshold confidence score, and based on the classifier search of the third set of vehicle features when the confidence score is below the threshold confidence score.

2. The device of claim 1, wherein the confidence score of the cascaded search is an aggregate of confidence scores determined during the searches for the first set of vehicle features and the second set of vehicle features.

3. The device of claim 1, wherein the feature extractor is a hue-saturation-value (HSV) feature extractor, the encoded image is an HSV encoded image, and wherein the search for the first set of vehicle features is performed in a hue space of the HSV encoded image, the hue space defined as pixels with a value and saturation level beyond a threshold, the threshold increasing as the value increases.

4. The device of claim 3, wherein the HSV feature extractor is to segment the hue space by hue.

5. The device of claim 4, wherein a taillight is a vehicle feature in the first set of vehicle features, the taillight identified by a red hue segment.

6. The device of claim 4, wherein a contrasting vehicle color is a vehicle feature in the first set of vehicle features, the contrasting vehicle color being beyond a threshold different than a surface color for the parking space.

7. The device of claim 3, wherein the search for the first set of vehicle features is performed in a value space of the HSV encoded image, the value space being the complement to the hue space.

8. The device of claim 7, wherein a license plate is a vehicle feature in the first set of vehicle features identified by a value space segment conforming to a shape model of a license plate.

9. The device of claim 1, wherein the first set of vehicle features that are found are assigned the confidence score of the cascaded search based on parameters of the search.

10. The device of claim 1, wherein a focus window is produced for vehicle features of the first set of vehicle features that are found, the focus window being included in the search results.

11. The device of claim 10, wherein to invoke the classifier, the controller is to provide the focus window to the classifier, the classifier to confine a search for a macro vehicle feature that corresponds to one or more of the first set of vehicle features found within the focus window.

12. The device of claim 11, wherein the macro vehicle feature comprises one of a vehicle bumper or a vehicle body.

13. A machine implemented method for generating a vehicle occupancy indicator for a parking space, the method comprising:
   receiving a color image from a camera, the image including a parking space;
   performing a cascaded search for a plurality of vehicle features in an encoded version of the color image to produce search results, wherein performing the cascaded search includes a search for a first set of first vehicle features of the plurality of vehicle features in the encoded version of the color image, and proceeding to search for a different second set of vehicle features of the plurality of vehicle features when a threshold number of the first set of vehicle features are not found;
   modifying a confidence score of a classifier based on a confidence score of the cascaded search;
   performing a search for a third set of vehicle features in the color image, without the encoding, using the classifier with the modified confidence score, to produce an indication of found vehicle features when the search results are of a first type, wherein the third set is different from the first set and the second set; and
   outputting an occupancy indicator based on the search results when the search results are of a second type and based on the indication otherwise, wherein the first type and the second type correspond to different confidence scores of the cascaded search.

14. The method of claim 13, wherein the confidence score of the cascaded search is an aggregate of confidence scores determined during the searches for the first set of vehicle features and the second set of vehicle features.

15. The method of claim 13, wherein the version of the color image is a hue-saturation-value (HSV) encoded image, and wherein searching for the first set of vehicle features is performed in a hue space of the HSV encoded image, the hue space defined as pixels with a value and saturation level beyond a threshold, the threshold increasing as the value increases.

16. The method of claim 15, comprising segmenting the hue space by hue.

17. The method of claim 16, wherein a taillight is a vehicle feature in the first set of vehicle features, the taillight identified by a red hue segment.

18. The method of claim 16, wherein a contrasting vehicle color is a vehicle feature in the first set of vehicle features, the contrasting vehicle color being beyond a threshold different than a surface color for the parking space.

19. The method of claim 15, wherein searching for the first set of vehicle features is performed in a value space of the HSV encoded image, the value space being the complement to the hue space.

20. The method of claim 19, wherein a license plate is a vehicle feature in the first set of vehicle features identified by a value space segment conforming to a shape model of a license plate.

21. The method of claim 3, wherein first set of vehicle features that are found are assigned the confidence score of the cascaded search based on parameters of the search.

22. The method of claim 13, comprising producing a focus window for vehicle features of the first set of vehicle features that are found, the focus window being a geometric shape that encompasses the first vehicle feature and is smaller than the color image, the focus window being included in the search results.

23. The method of claim 22, wherein performing the search for the third set of vehicle features includes confining a search for a macro vehicle feature that corresponds to at least one vehicle feature of the first set of vehicle features found within the focus window.

24. The method of claim 13, wherein the search results are of the first type when searching for the second set of vehicle features was performed, and the search results are of the second type otherwise.

25. The method of claim 13, wherein the search results are of the first type when the confidence score of the cascaded search is below a threshold level, and of the second type when the confidence score of the cascaded search is at or above the threshold level.

26. The device of claim 23, wherein the macro vehicle feature comprises one of a vehicle bumper or a vehicle body.

\* \* \* \* \*

UNITED STATES PATENT AND TRADEMARK OFFICE
CERTIFICATE OF CORRECTION

PATENT NO. : 10,008,115 B2
APPLICATION NO. : 15/056645
DATED : June 26, 2018
INVENTOR(S) : Raka Singh Page 1 of 1

It is certified that error appears in the above-identified patent and that said Letters Patent is hereby corrected as shown below:

On the Title Page

In item (*), in "Notice", in Column 1, Line 3, delete "days. days." and insert --days.-- therefor In the Claims In Column 17, Lines 35-36, in Claim 3, delete "endcoded" and insert --encoded-- therefor In Column 18, Line 61, in Claim 21, delete "claim 3," and insert --claim 13,-- therefor In Column 18, Line 67, in Claim 22, delete "first" and insert --found-- therefor Signed and Sealed this
Eleventh Day of June, 2019

Andrei Iancu
*Director of the United States Patent and Trademark Office*